(12) United States Patent
Phillips

(10) Patent No.: US 8,152,683 B2
(45) Date of Patent: Apr. 10, 2012

(54) EIGHT TO THIRTEEN SPEED AUTOMATIC TRANSMISSION

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 269 days.

(21) Appl. No.: 12/685,532

(22) Filed: Jan. 11, 2010

(65) Prior Publication Data

US 2010/0331138 A1 Dec. 30, 2010

Related U.S. Application Data

(60) Provisional application No. 61/220,664, filed on Jun. 26, 2009.

(51) Int. Cl.
*F16H 3/62* (2006.01)
(52) U.S. Cl. .................................................... 475/275
(58) Field of Classification Search .......... 475/275–278, 475/284, 296
See application file for complete search history.

(56) References Cited

U.S. PATENT DOCUMENTS

| | | | | |
|---|---|---|---|---|
| 6,991,578 B2 * | 1/2006 | Ziemer | | 475/296 |
| 7,018,319 B2 * | 3/2006 | Ziemer | | 475/296 |
| 7,115,061 B2 * | 10/2006 | Tiesler et al. | | 475/276 |
| 7,163,484 B2 | 1/2007 | Klemen | | |
| 7,201,698 B2 * | 4/2007 | Gumpoltsberger | | 475/276 |
| 7,211,022 B2 * | 5/2007 | Tiesler et al. | | 475/275 |
| 2006/0270513 A1 | 11/2006 | Klemen | | |
| 2006/0270516 A1 | 11/2006 | Klemen | | |
| 2008/0293537 A1 * | 11/2008 | Phillips | | 475/283 |

* cited by examiner

*Primary Examiner* — Ha D. Ho

(57) ABSTRACT

An eight, nine, eleven or thirteen speed automatic transmission has an input and output, four planetary gear assemblies, four connecting members for coupling certain elements of the planetary gear assemblies to other elements, four brakes for selectively connecting certain elements of the planetary gear assemblies to ground and three friction clutches for selectively connecting certain elements of the planetary gear assemblies to other elements. Sequenced operation of the brakes and clutches provides, eight, nine, eleven or thirteen forward speeds or gear ratios and reverse.

16 Claims, 3 Drawing Sheets

|  |  |  | BRAKES | | | | CLUTCHES | | |
| --- | --- | --- | --- | --- | --- | --- | --- | --- | --- |
| GEAR STATE | GEAR RATIO | RATIO STEP | 72 | 74 | 76 | 78 | 82 | 84 | 86 |
| REV | -3.405 |  | X |  | G |  |  | X |  |
| N |  | -0.80 | O |  |  |  |  | O |  |
| 1ST | 4.239 |  | X |  |  | G |  | X |  |
| 2ND | 2.596 | 1.63 |  | X |  | X |  | X |  |
| 3RD | 1.751 | 1.48 |  |  | X | X |  | X |  |
| 4TH | 1.356 | 1.29 |  |  |  | X | X | X |  |
| 5TH | 1.000 | 1.36 |  |  | X |  | X | X |  |
| 6TH | 0.773 | 1.29 |  | X |  |  | X | X |  |
| 7TH | 0.665 | 1.16 |  |  | X |  | X |  | X |
| 8TH | 0.556 | 1.20 |  | X |  |  | X |  | X |
| 9TH |  |  |  |  |  |  |  |  |  |
| 10TH |  |  |  |  |  |  |  |  |  |
| 11TH |  |  |  |  |  |  |  |  |  |
| 12TH |  |  |  |  |  |  |  |  |  |
| 13TH |  |  |  |  |  |  |  |  |  |
| 14TH |  |  |  |  |  |  |  |  |  |
| 15TH |  |  |  |  |  |  |  |  |  |
| OVERALL RATIO | | 7.62 | | | | | | | |

X = ON, CARRYING TORQUE    G = GARAGE-SHIFT ELEMENT ON AND CARRYING TORQUE
O = ON, NOT CARRYING TORQUE

FIG. 3

|  |  |  | BRAKES | | | | CLUTCHES | | |
| --- | --- | --- | --- | --- | --- | --- | --- | --- | --- |
| GEAR STATE | GEAR RATIO | RATIO STEP | 72 | 74 | 76 | 78 | 82 | 84 | 86 |
| REV | -3.144 |  | X |  | G |  |  | X |  |
| N |  | -0.65 | O |  |  |  |  | O |  |
| 1ST | 4.860 |  | X |  |  | G |  | X |  |
| 2ND | 3.719 | 1.31 | X |  |  | X |  |  | X |
| 3RD | 2.821 | 1.32 |  | X |  | X |  | X |  |
| 4TH | 2.159 | 1.31 |  | X |  | X |  |  | X |
| 5TH | 1.711 | 1.26 |  |  | X | X |  | X |  |
| 6TH | 1.318 | 1.30 |  |  |  | X | X | X |  |
| 7TH | 1.000 | 1.32 |  |  | X |  | X | X |  |
| 8TH | 0.759 | 1.32 |  | X |  |  | X | X |  |
| 9TH | 0.581 | 1.31 |  | X |  |  | X |  | X |
| 10TH |  |  |  |  |  |  |  |  |  |
| 11TH |  |  |  |  |  |  |  |  |  |
| 12TH |  |  |  |  |  |  |  |  |  |
| 13TH |  |  |  |  |  |  |  |  |  |
| 14TH |  |  |  |  |  |  |  |  |  |
| 15TH |  |  |  |  |  |  |  |  |  |
| OVERALL RATIO | | 8.37 | | | | | | | |

X = ON, CARRYING TORQUE    G = GARAGE-SHIFT ELEMENT ON AND CARRYING TORQUE
O = ON, NOT CARRYING TORQUE

FIG. 4

| | | | BRAKES | | | | CLUTCHES | | |
|---|---|---|---|---|---|---|---|---|---|
| GEAR STATE | GEAR RATIO | RATIO STEP | 72 | 74 | 76 | 78 | 82 | 84 | 86 |
| REV | -3.757 | | X | | G | | | X | |
| N | | -0.75 | O | | | | | O | |
| 1ST | 4.978 | | X | | | G | | X | |
| 2ND | 3.932 | 1.27 | X | | | X | | | X |
| 3RD | 3.130 | 1.26 | | X | | X | | X | |
| 4TH | 2.472 | 1.27 | | X | | X | | | X |
| 5TH | 2.098 | 1.18 | | | X | X | | X | |
| 6TH | 1.780 | 1.18 | | | X | X | | | X |
| 7TH | 1.490 | 1.19 | | | | X | X | X | |
| 8TH | 1.177 | 1.27 | | | | X | X | | X |
| 9TH | 1.000 | 1.18 | | | X | | | X | X |
| 10TH | 0.790 | 1.27 | | X | | | | X | X |
| 11TH | 0.624 | 1.27 | | X | | | X | | X |
| 12TH | | | | | | | | | |
| 13TH | | | | | | | | | |
| 14TH | | | | | | | | | |
| 15TH | | | | | | | | | |
| OVERALL RATIO | | 7.98 | | | | | | | |

X = ON, CARRYING TORQUE  G = GARAGE-SHIFT ELEMENT
O = ON, NOT CARRYING TORQUE  ON AND CARRYING TORQUE

FIG. 5

| | | | BRAKES | | | | CLUTCHES | | |
|---|---|---|---|---|---|---|---|---|---|
| GEAR STATE | GEAR RATIO | RATIO STEP | 72 | 74 | 76 | 78 | 82 | 84 | 86 |
| REV | -3.423 | | X | | G | | | X | |
| N | | -0.58 | O | | | | | O | |
| 1ST | 5.919 | | X | | | G | | X | |
| 2ND | 4.539 | 1.30 | X | | | X | | | X |
| 3RD | 3.620 | 1.25 | | X | | X | | X | |
| 4TH | 3.170 | 1.14 | | | X | X | X | | |
| 5TH | 2.776 | 1.14 | | X | | X | | | X |
| 6TH | 2.166 | 1.28 | | | X | X | | X | |
| 7TH | 1.832 | 1.18 | | | X | X | | | X |
| 8TH | 1.491 | 1.23 | | | | X | X | X | |
| 9TH | 1.143 | 1.30 | | | | X | X | | X |
| 10TH | 1.000 | 1.14 | | | X | | | X | X |
| 11TH | 0.774 | 1.29 | | X | | | | X | X |
| 12TH | 0.718 | 1.08 | | | X | | X | | X |
| 13TH | 0.593 | 1.21 | | X | | | X | | X |
| 14TH | | | | | | | | | |
| 15TH | | | | | | | | | |
| OVERALL RATIO | | 9.98 | | | | | | | |

X = ON, CARRYING TORQUE  G = GARAGE-SHIFT ELEMENT
O = ON, NOT CARRYING TORQUE  ON AND CARRYING TORQUE

FIG. 6

EIGHT TO THIRTEEN SPEED AUTOMATIC TRANSMISSION

CROSS-REFERENCE TO RELATED APPLICATION

This patent application claims the benefit of U.S. Provisional Application Ser. No. 61/220,664, filed Jun. 26, 2009. The disclosure of this provisional application is incorporated herein by reference.

FIELD

The present disclosure relates to a multiple speed automatic transmission for motor vehicles and more particularly to eight, nine, eleven and thirteen speed automatic transmissions for motor vehicles, especially passenger cars, sport utility vehicles, crossover vehicles and light trucks.

BACKGROUND

The statements in this section merely provide background information related to the present disclosure and may or may not constitute prior art.

A typical modern multiple speed automatic transmission includes a plurality of planetary gear assemblies and selectively engaged friction clutches and brakes that achieve a plurality of forward speeds or gear ratios and reverse.

Increasingly demanding economic, performance and efficiency goals continue to encourage automatic transmission research and development. A result of this effort has been a steady increase in the number of available forward speeds or gear ratios in an automatic transmission.

Whereas three or four speed automatic transmissions were once commonplace and considered to provide sufficient operating flexibility and performance, the industry and consumer preference has moved to five, six and eight speed automatic transmissions.

In such transmissions, the elements of a plurality of planetary gear assemblies are (1) connected by permanent coupling members, (2) selectively connected by friction clutches or (3) selectively grounded by brakes. Specific combinations of the clutches and brakes are engaged or activated in sequence to provide a predetermined sequence of numerically related gear ratios and thus output speeds and torques.

Because they so closely match the power and torque outputs of an engine to vehicle speed and load, five, six and eight speed automatic transmissions provide significant performance enhancements and fuel consumption reduction. Nonetheless, such transmissions are known to have drawbacks. A pair of known and related drawbacks are complexity and cost. A corollary to such complexity is frictional loss. Each of the torque transmitting devices, namely, the clutches and brakes, contributes to frictional losses, referred to as spin losses, when they are not engaged. Three primary factors influence spin losses: the total number of clutches and brakes, the size or torque capacity of the clutch or brake and the instantaneous speed difference between the input and output of the clutch or brake. Frictional losses, of course, also increase with increasing transmission complexity.

Because of their benefits and in spite of their drawbacks, there is ongoing and increasing demand for automatic transmissions having eight or more forward gears or speed ratios. The present invention provides an automatic transmission having eight, nine, eleven or thirteen forward speeds or gear ratios and one which exhibits reduced frictional losses.

SUMMARY

The present invention provides an eight, nine, eleven or thirteen speed automatic transmission having input and output members, four planetary gear assemblies, four connecting members for coupling certain elements of the planetary gear assemblies to other elements, four friction brakes for selectively connecting certain elements of the planetary gear assemblies to ground and three friction clutches for selectively connecting certain elements of the planetary gear assemblies to other elements.

Specifically, an input shaft or member is coupled to and drives a planet gear carrier of a fourth planetary gear assembly. An output shaft or member is coupled to and driven by a planet gear carrier of a first planetary gear assembly. A first connecting member couples a planet gear carrier of the first planetary gear assembly to a ring gear of a third planetary gear assembly. A second connecting member couples a ring gear of a second planetary gear assembly to the planet gear carrier of the third planetary gear assembly. A third connecting member couples a ring gear of the first planetary gear assembly to a planet gear carrier of the second planetary gear assembly. A fourth connecting member couples a sun gear of the second planetary gear assembly to a ring gear of the fourth planetary gear assembly.

A first brake is disposed between the planet gear carrier of the third planetary gear assembly and ground. A second brake is disposed between a sun gear of the third planetary gear assembly and ground. A third brake is disposed between a sun gear of the first planetary gear assembly and ground and a fourth brake is disposed between a sun gear of the fourth planetary gear assembly and ground.

A first friction clutch is disposed between the input shaft or member and the sun gear of the third planetary gear assembly. A second friction clutch is disposed between the sun gear of the second planetary gear assembly and the planet gear carrier of the third planetary gear assembly (and the ring gear of the second planetary gear assembly). A third friction clutch is disposed between the ring gear of the fourth planetary gear assembly and the sun gear of the fourth planetary gear assembly.

Engagement and release of the seven torque transmitting devices (the four brakes and the three clutches) in the automatic transmission in a predetermined sequence provides eight, nine, eleven or thirteen forward gears or speed ratios and reverse.

Thus is it an object of the present invention to provide an automatic transmission having eight forward gears or speed ratios and reverse.

It is a further object of the present invention to provide an automatic transmission having nine forward gears or speed ratios and reverse.

It is a still further object of the present invention to provide an automatic transmission having eleven forward gears or speed ratios and reverse.

It is a still further object of the present invention to provide an automatic transmission having thirteen forward gears or speed ratios and reverse.

It is a still further object of the present invention to provide an automatic transmission having four planetary gear assemblies and a plurality of friction clutches and brakes.

It is a still further object of the present invention to provide an automatic transmission having four planetary gear assemblies, three friction clutches and four brakes.

It is a still further object of the present invention to provide an automatic transmission having four planetary gear assemblies and four interconnecting members.

It is a still further object of the present invention to provide an automatic transmission having an input member, an output member and four planetary gear assemblies.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a truth table presenting the various combinations of engaged clutches and brakes which achieve a given forward or reverse gear or speed ratio and provide eight forward speeds in a multiple speed automatic transmission according to the present invention;

FIG. 4 is a truth table presenting the various combinations of engaged clutches and brakes which achieve a given forward or reverse gear or speed ratio and provide nine forward speeds in a multiple speed automatic transmission according to the present invention;

FIG. 5 is a truth table presenting the various combinations of engaged clutches and brakes which achieve a given forward or reverse gear or speed ratio and provide eleven forward speeds in a multiple speed automatic transmission according to the present invention; and FIG. 6 is a truth table presenting the various combinations of engaged clutches and brakes which achieve a given forward or reverse gear or speed ratio and provide thirteen forward speeds in a multiple speed automatic transmission according to the present invention.

DETAILED DESCRIPTION

The following description is merely exemplary in nature and is not intended to limit the present disclosure, application, or uses.

Figure 1:
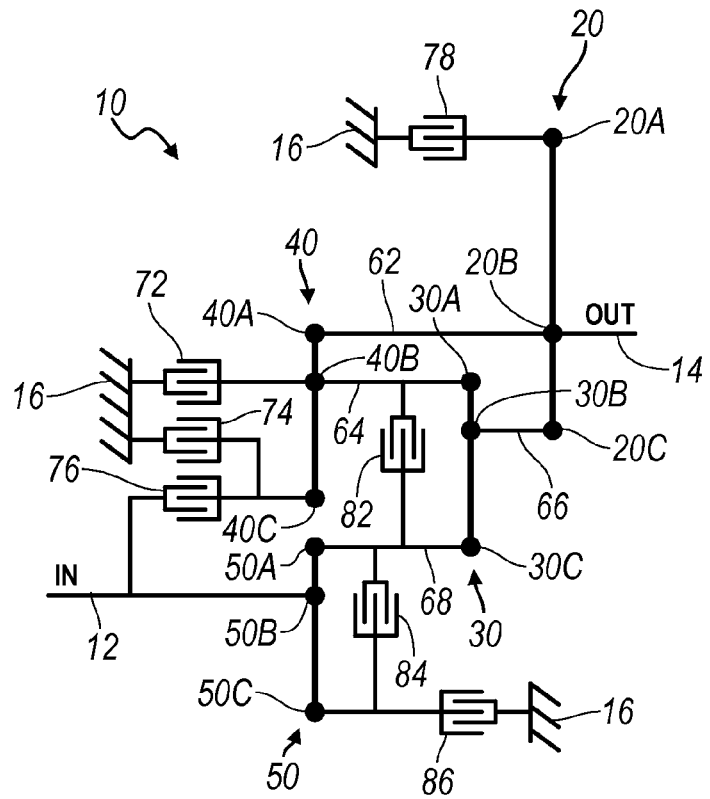
FIG. 1 is a lever diagram of a multiple speed transmission according to the present invention.

With reference to FIG. 1, a multiple, i.e., eight, nine, eleven or thirteen, speed automatic transmission 10 according to the present invention is illustrated in a lever diagram. A lever diagram is a schematic representation of the components of an automatic transmission wherein certain components such as planetary gear assemblies are represented by nodes. The relative lengths of the vertical bars between the nodes of a planetary gear assembly represent the ratios between the components. Mechanical couplings or interconnections between the nodes of the planetary gear assemblies are represented by horizontal lines and torque transmitting devices such as friction clutches and brakes are represented by interleaved or nested fingers. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The multiple speed automatic transmission 10 includes an input shaft or member 12 which receives drive torque, an output shaft or member 14 which provides drive torque and a housing 16 which is referred to as "ground" with reference to FIG. 1. The automatic transmission 10 also includes four planetary gear assemblies. A first planetary gear assembly 20 includes a first node 20A, a second node 20B which is coupled to and drives the output shaft or member 14 and a third node 20C. A second planetary gear assembly 30 includes a first node 30A, a second node 30B and a third node 30C. A third planetary gear assembly 40 includes a first node 40A, a second node 40B and a third node 40C. Finally, a fourth planetary gear assembly 50 includes a first node 50A, a second node 50B which is coupled to and driven by the input shaft or member 12 and a third node 50C.

The automatic transmission 10 also includes four rigid or fixed interconnecting shafts, quills or members between certain elements of the four planetary gear assemblies 20, 30, 40 and 50. The second node 20B of the first planetary gear assembly 20 is coupled to the first node 40A of the third planetary gear assembly 40 by a first connecting member 62. The first node 30A of the second planetary gear assembly 30 is coupled to the second node 40B of the third planetary gear assembly 40 by a second connecting member 64. The third node 20C of the first planetary gear assembly 20 is coupled to the second node 30B of the second planetary gear assembly 30 by a third connecting member 66. And the third node 30C of the second planetary gear assembly 30 is coupled to the first node 50A of the fourth planetary gear assembly 50 by a fourth connecting member 68.

Additionally, the second node 40B of the third planetary gear assembly 40 (and the first node 30A of the second planetary gear assembly 30) is selectively connected to ground 16 by a first friction brake 72. The third node 40C of the third planetary gear assembly 40 is selectively connected to ground 16 by a second friction brake 74. The third node 40C of the third planetary gear assembly 40 is also selectively connected to the input shaft or member 12 (and the second node 50B of the fourth planetary gear assembly 50) by a first friction clutch 76. The first node 20A of the first planetary gear assembly 20 is selectively connected to ground 16 by a third brake 78. The first node 30A of the second planetary gear assembly 30 (and the second node 40B of the third planetary gear assembly 40) is selectively connected to the third node 30C of the second planetary gear assembly 30 (and the first node 50A of the fourth planetary gear assembly 50) by a second friction clutch 82. The first node 50A of the fourth planetary gear assembly 50 (and the third node 30C of the second planetary gear assembly 30) is selectively connected to the third node 50C of the fourth planetary gear assembly 50 by a third friction clutch 84. Finally, the third node 50C of the fourth planetary gear assembly 50 is selectively connected to ground 16 by a fourth brake 86.

Figure 2:
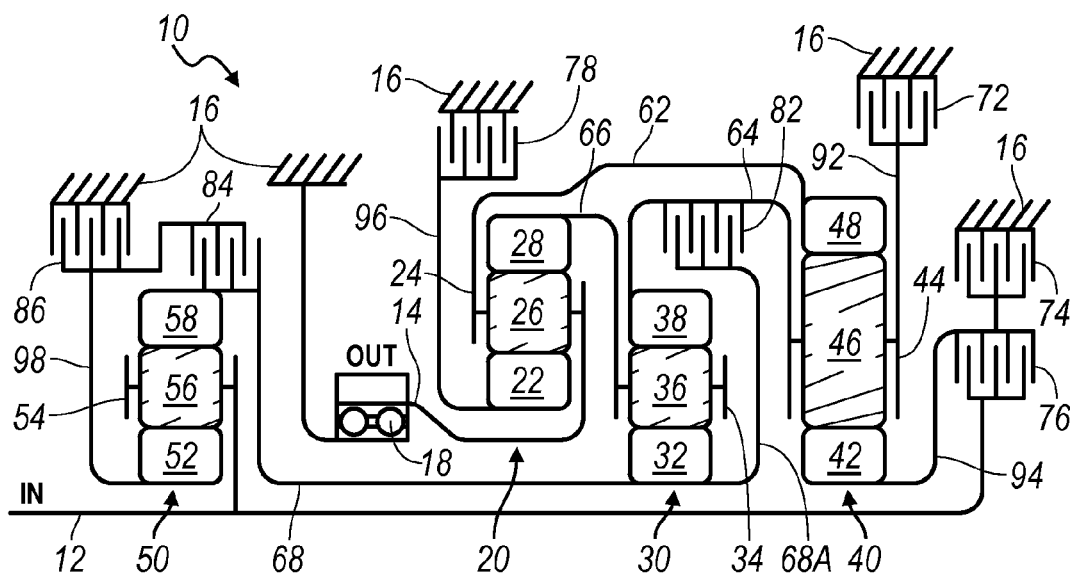
FIG. 2 is a diagrammatic view of an multiple speed automatic transmission according to the present invention.

Referring now to FIG. 2, the multiple speed automatic transmission 10 according to the present invention is illustrated diagrammatically. The automatic transmission 10 includes the input shaft or member 12 which is driven by a prime mover (not illustrated) such as a gasoline, Diesel, flex-fuel or hybrid power plant, the output shaft or member 14 which drives a final drive assembly (not illustrated) and the housing 16 (referred to in FIG. 1 as ground) which includes various openings, bores, flanges and other features and receives, positions and protects the various components of the automatic transmission 10. For example, the housing supports and locates a ball bearing assembly 18 which in turns locates and rotatably supports the output shaft or member 14 which may take the form of a ring gear.

The automatic transmission 10 also includes the first, simple planetary gear assembly 20 having a first sun gear 22, a first planet gear carrier 24 and a first ring gear 28. Rotatably disposed in the first planet gear carrier 24 on stub shafts and/or bearings (not illustrated) are a plurality of first planet gears 26, one of which is illustrated in FIG. 2. Each of the plurality of first planet gears 26 is in constant mesh with the first sun gear 22 and the first ring gear 28. The second, simple planetary gear assembly 30 includes a second sun gear 32, a second planet gear carrier 34 and a second ring gear 38. Rotatably disposed in the second planet gear carrier 34 on stub shafts and/or bearings (not illustrated) are a plurality of second planet gears 36, one of which is illustrated in FIG. 2. Each of the plurality of second planet gears 36 is in constant mesh with the second sun gear 32 and the second ring gear 38.

The third, simple planetary gear assembly 40 includes a third sun gear 42, a third planet gear carrier 44 and a third ring gear 48. Rotatably disposed in the third planet gear carrier 44 on stub shafts and/or bearings (not illustrated) are a plurality of third planet gears 46, one of which is illustrated in FIG. 2. Each of the plurality of third planet gears 46 is in constant mesh with the third sun gear 42 and the third ring gear 48. The fourth, simple planetary gear assembly 50 includes a fourth sun gear 52, a fourth planet gear carrier 54 and a fourth ring gear 58. Rotatably disposed in the fourth planet gear carrier 54 on stub shafts and/or bearings (not illustrated) are a plurality of fourth planet gears 56, one of which is illustrated in FIG. 2. Each of the plurality of fourth planet gears 56 is in constant mesh with the fourth sun gear 52 and the fourth ring gear 58.

The automatic transmission 10 further includes a plurality of rigid or fixed interconnections between the components of the four planetary gear assemblies 20, 30, 40 and 50. These interconnections take the form of shafts, quills (tubular drive members) and other configurations such as essentially direct coupling depending upon the proximity and configuration of the components within the automatic transmission 10. The input shaft or member 12 is coupled to and drives the fourth planet gear carrier 54 of the fourth planetary gear assembly 50. The output shaft, quill or member 14 is coupled to and driven by the first planet gear carrier 24 of the first planetary gear assembly 20.

A first shaft, quill or drive member 62 interconnects the first planet gear carrier 24 of the first planetary gear assembly 20 and the third ring gear 48 of the third planetary gear assembly 40. A second shaft, quill or drive member 64 interconnects the second ring gear 38 of the second planetary gear assembly 30 and the third planet gear carrier 44 of the third planetary gear assembly 40. A third shaft, quill or drive member 66 interconnects the first ring gear 28 of the first planetary gear assembly 20 and the second planet gear carrier 34 of the second planetary gear assembly 30. A fourth shaft, quill or drive member 68 interconnects the second sun gear 32 of the second planetary gear assembly 30 and the fourth ring gear 58 of the fourth planetary gear assembly 50. Additional interconnecting members are associated with the torque transmitting devices and are delineated and described directly below.

The automatic transmission 10 further includes a plurality of torque transmitting devices, namely, four brakes and three friction clutches. As utilized herein, the term "friction clutch" refers to any torque transmitting device having first and second pluralities of interleaved, rotatable friction plates or discs which are compressed by an associated operator or actuator to transmit torque. The term "brake" refers to a similar device in which one of the pluralities of plates or discs is stationary, e.g., grounded or connected to the housing 16. It should be understood, however, that other clutch types and configurations are within the purview of this invention. The first brake 72 is disposed between the housing 16 and a fifth shaft, quill or member 92 that is coupled to the third planet carrier 44 of the third planetary gear assembly 40. The first brake 72 selectively grounds the third planet carrier 44. The second brake 74 is disposed between the housing 16 and a sixth shaft, quill or member 94 that is coupled to the third sun gear 42 of the third planetary gear assembly 42. The second brake 74 selectively grounds the third sun gear 42. The first friction clutch 76 is disposed between the input shaft 12 and the sixth shaft, quill or member 94 which is coupled to the third sun gear 42 of the third planetary gear assembly 42. The first friction clutch 76 selectively connects the input shaft to the third sun gear 42 (and to the second brake 74).

The third brake 78 is disposed between the housing 16 and a seventh shaft, quill or member 96 that is coupled to the first sun gear 22 of the first planetary gear assembly 20. The third brake 78 selectively grounds the first sun gear 22. A second friction clutch 82 is disposed between the second shaft, quill or drive member 64 which interconnects the second ring gear 38 and the third planet gear carrier 44 and an extension 68A of the fourth shaft, quill or drive member 68 which interconnects the second sun gear 32 and the fourth ring gear 58. The second friction clutch 82 selectively connects the second shaft, quill or drive member 64 to the extension 68A of the fourth shaft, quill or drive member 68. A third friction clutch 84 is disposed between the fourth ring gear 58 of the fourth planetary gear assembly 50 (and the fourth shaft, quill or drive member 68) and an eighth shaft, quill or member 98 that is coupled to the fourth sun gear 52 of the fourth planetary gear assembly 50. The third friction clutch 84 selectively connects the fourth ring gear 58 to the fourth sun gear 52. A fourth brake 86 is disposed between the fourth sun gear 52 and the eighth shaft, quill or member 98 and the housing 16. The fourth brake 86 selectively grounds the fourth sun gear 52.

Referring now to FIGS. 2 and 3, operation of the automatic transmission 10 according to the present invention to provide eight forward speeds or gear ratios and reverse will first be described. Each forward or reverse gear is achieved by activation or engagement of various combinations of clutches and brakes as will be explained below. FIG. 3 is a truth table which presents the various combinations of clutches and brakes that are activated or engaged to achieve eight forward speeds or gear ratios and reverse. In the truth tables of FIGS. 3, 4, 5 and 6, an "X" appearing in a column indicates activation or engagement of the subject clutch or brake and that the clutch or brake is carrying torque. An "O" appearing in a column indicates that the subject clutch or brake is activated or engaged but that it is not carrying torque. A "G" indicates a garage (start-up) shift and that the clutch or brake is activated or engaged and is carrying torque. No entry in a column indicates that the subject clutch or brake is inactive or disengaged.

The actual gear ratio and ratio steps are also provided in FIGS. 3, 4, 5 and 6 although it should be understood that these numerical values are presented for purposes of example and illustration only and that such values may be adjusted over significant ranges to accommodate various applications and operational criteria of the automatic transmission 10.

In reverse, referred to in FIG. 3 as "Rev," the first brake 72 and the third friction clutch 84 are activated or engaged. The first friction clutch 76 is a garage shift element, is also activated or engaged and is carrying torque.

In neutral, referred to by the letter "N" in FIG. 3, the first brake 72 and the third friction clutch 84 are activated or engaged but neither is carrying torque.

In first gear, the first brake 72 and the third friction clutch 84 are activated or engaged. The third brake 78, a garage shift element, is also activated or engaged and is carrying torque.

Second gear is achieved by deactivating or disengaging the first brake 72 and activating or engaging the second brake 74 while maintaining activation or engagement of the third brake 78 and the third friction clutch 84.

Third gear is achieved by deactivating or disengaging the second brake 74 and activating or engaging the first friction clutch 76 while maintaining activation or engagement of the third brake 78 and the third friction clutch 84.

Fourth gear is achieved by deactivating or disengaging the first friction clutch 76 and activating or engaging the second friction clutch 82 while maintaining activation or engagement of the third brake 78 and the third friction clutch 84.

Fifth gear is achieved by deactivating or disengaging the third brake 78 and activating or engaging the first friction clutch 76 while maintaining activation or engagement of the second friction clutch 82 and the third friction clutch 84.

Sixth gear is achieved by deactivating or disengaging the first friction clutch 76 and activating or engaging the second brake 74 while maintaining activation or engagement of the second friction clutch 82 and the third friction clutch 84.

Seventh gear is achieved by deactivating or disengaging the second brake 74 and the third friction clutch 84 and activating or engaging the first friction clutch 76 and the fourth brake 86 while maintaining activation or engagement of the second friction clutch 82.

Eighth gear is achieved by deactivating or disengaging the first friction clutch 76 and activating or engaging the second brake 74 while maintaining activation or engagement of the second friction clutch 82 and the fourth brake 86.

Referring now to FIGS. 2 and 4, operation of the automatic transmission 10 according to the present invention to provide nine forward speeds or gear ratios and reverse will be described. FIG. 4 is a truth table which presents the various combinations of clutches and brakes that are activated or engaged to achieve nine forward speeds or gear ratios and reverse.

In reverse, referred to in FIG. 4 as "Rev," the first brake 72 and the third friction clutch 84 are activated or engaged. The first friction clutch 76 is a garage shift element, is activated or engaged and is carrying torque.

In neutral, referred to by the letter "N" in FIG. 4, the first brake 72 and the third friction clutch 84 are activated or engaged but neither is carrying torque.

In first gear, the first brake 72 and the third friction clutch 84 are activated or engaged. The third brake 78, a garage shift element, is also activated or engaged and is carrying torque.

Second gear is achieved by deactivating or disengaging the third friction clutch 84 and activating or engaging the fourth brake 86 while maintaining activation or engagement of the first brake 72 and the third brake 78.

Third gear is achieved by deactivating or disengaging the first brake 72 and the fourth brake 86 and activating or engaging the second brake 74 and the third friction clutch 84 while maintaining activation or engagement of the third brake 78.

Fourth gear is achieved by deactivating or disengaging the third friction clutch 84 and activating or engaging the fourth brake 86 while maintaining activation or engagement of the second brake 74 and the third brake 78.

Fifth gear is achieved by deactivating or disengaging the second brake 74 and the fourth brake 86 and activating or engaging the first friction clutch 76 and the third friction clutch 84 while maintaining activation or engagement of the third brake 78.

Sixth gear is achieved by deactivating or disengaging the first friction clutch 76 and activating or engaging the second friction clutch 82 while maintaining activation or engagement of the third brake 78 and the third friction clutch 84.

Seventh gear is achieved by deactivating or disengaging the third brake 78 and activating or engaging the first friction clutch 76 while maintaining activation or engagement of the second friction clutch 82 and the third friction clutch 84.

Eighth gear is achieved by deactivating or disengaging the first friction clutch 76 and activating or engaging the second brake 74 while maintaining activation or engagement of the second friction clutch 82 and the third friction clutch 84.

Ninth gear is achieved by deactivating or disengaging the third friction clutch 84 and activating or engaging the fourth brake 86 while maintaining activation or engagement of the second brake 74 and the second friction clutch 82.

Referring now to FIGS. 2 and 5, operation of the automatic transmission 10 according to the present invention to provide eleven forward speeds or gear ratios and reverse will be described. FIG. 5 is a truth table which presents the various combinations of clutches and brakes that are activated or engaged to achieve eleven forward speeds or gear ratios and reverse. Inspection of the truth tables of FIG. 4, for a nine speed automatic transmission 10, and FIG. 5, for an eleven speed automatic transmission 10 reveals that the clutch and brake operating sequence and states are the same for reverse, neutral and forward gears first through fifth. The above description for gears reverse through fifth for the nine speed automatic transmission 10 applies equally to the eleven speed automatic transmission 10 and thus it will not be repeated here. Reference thereto is suggested and such description is incorporated herein by reference.

To achieve sixth gear (from fifth gear), the third friction clutch 84 is deactivated or disengaged and the fourth brake 86 is activated or engaged while activation or engagement of the first friction clutch 76 and the third brake 78 is maintained.

Seventh gear is achieved by deactivating or disengaging the first friction clutch 76 and the fourth brake 86 and activating or engaging the second friction clutch 82 and the third friction clutch 84 while maintaining activation or engagement of the third brake 78.

Eighth gear is achieved by deactivating or disengaging the third friction clutch 84 and activating or engaging the fourth brake 86 while maintaining activation or engagement of the third brake 78 and the second friction clutch 82.

Ninth gear is achieved by deactivating or disengaging the third brake 78 and the fourth brake 86 and activating or engaging the first friction clutch 76 and the third friction clutch 84 while maintaining activation or engagement of the second friction clutch 82.

Tenth gear is achieved by deactivating or disengaging the first friction clutch 76 and activating or engaging the second brake 74 while maintaining activation or engagement of the second friction clutch 82 and the third friction clutch 84.

Eleventh gear is achieved by deactivating or disengaging the third friction clutch 84 and activating or engaging the fourth brake 86 while maintaining activation or engagement of the second brake 74 and the second friction clutch 82.

Referring now to FIGS. 2 and 6, operation of the automatic transmission 10 according to the present invention to provide thirteen forward speeds or gear ratios and reverse will be described. FIG. 6 is a truth table which presents the various combinations of clutches and brakes that are activated or engaged to achieve thirteen forward speeds or gear ratios and reverse. Inspection of the truth tables of FIG. 4, for a nine speed automatic transmission 10, FIG. 5, for an eleven speed automatic transmission 10 and FIG. 6 for a thirteen speed automatic transmission 10 reveals that the clutch and brake operating sequence and states are the same for reverse, neutral and forward gears first through third. The above descriptions for gears reverse through third of the nine and eleven speed automatic transmissions 10 apply equally to the thirteen speed transmission 10 and thus they will not be repeated here. Reference thereto is suggested and such descriptions are incorporated herein by reference.

To achieve fourth gear (from third gear), the second brake 74 and the third friction clutch 84 are deactivated or disengaged and the first friction clutch 76 and the second friction clutch 82 are activated or engaged while activation or engagement of the third brake 78 is maintained.

Fifth gear is achieved by deactivating or disengaging the first friction clutch 76 and the second friction clutch 82 and activating or engaging the second brake 74 and the fourth brake 86 while maintaining activation or engagement of the third brake 78.

Sixth gear is achieved by deactivating or disengaging the second brake 74 and the fourth brake 86 and activating or engaging the first friction clutch 76 and the third friction clutch 84 while maintaining activation or engagement of the third brake 78.

Seventh gear is achieved by deactivating or disengaging the third friction clutch 84 and activating or engaging the fourth brake 86 while maintaining activation or engagement of the first friction clutch 76 and the third brake 78.

Eighth gear is achieved by deactivating or disengaging the first friction clutch 76 and the fourth brake 86 and activating or engaging the second friction clutch 82 and the third friction clutch 84 while maintaining activation or engagement of the third brake 78.

Ninth gear is achieved by deactivating or disengaging the third friction clutch 84 and activating the fourth brake 86 while maintaining activation or engagement of the third brake 78 and the second friction clutch 82.

Tenth gear is achieved by deactivating or disengaging the third brake 78 and the fourth brake 86 and activating or engaging the first friction clutch 76 and the third friction clutch 84 while maintaining activation or engagement of the second friction clutch 82.

Eleventh gear is achieved by deactivating or disengaging the first friction clutch 76 and activating or engaging the second brake 74 while maintaining activation or engagement of the second friction clutch 82 and the third friction clutch 84.

Twelfth gear is achieved by deactivating or disengaging the second brake 74 and the third friction clutch 84 and activating or engaging the first friction clutch 76 and the fourth brake 86 while maintaining activation or engagement of the second friction clutch 82.

Thirteenth gear is achieved by deactivating or disengaging the first friction clutch 76 and activating or engaging the second brake 74 while maintaining activation or engagement of the second friction clutch 82 and the fourth brake 86.

It should be appreciated that in all of the foregoing operational configurations, the fourth planetary gear assembly 50 functions essentially as a selectable direct drive/overdrive gearset but it does not feed all of the remaining powerflow, since the input is fed directly to the sun gear 42 of the third planetary gear assembly 40 in gears three, five, seven and reverse.

The foregoing descriptions of operation of the automatic transmission 10 assumes that all the brakes 72, 74, 78 and 86 the friction clutches 76, 82 and 84 not specifically referenced in a given gear ratio are inactive or disengaged, as noted above. The descriptions also assume that during gear shift between at least adjacent gear ratios, a clutch or brake that is activated or engaged in both gear ratios will remain activated or engaged during the shift. The descriptions also assume that an upshift is occurring from the adjacent lower numbered gear.

The foregoing descriptions further assume that downshifts follow essentially the opposite sequence of the corresponding upshifts and that several power-on skip shifts, e.g., from first gear to third gear are possible. Finally, it should be understood that the various brakes and clutches are intended to and will be under the control of either a hydraulic or electronic transmission control module (TCM) which receives various data regarding engine and vehicle speed and load and throttle position and commands shifts in accordance with operator commands and operating algorithms.

The description of the invention is merely exemplary in nature and variations that do not depart from the gist of the invention are intended to be within the scope of the invention. Such variations are not to be regarded as a departure from the spirit and scope of the invention.

I claim:

1. A multiple speed automatic transmission comprising, in combination, a first, a second, a third and a fourth planetary gear assembly, each having first, second and third members, an input member connected to one of said members of said fourth planetary gear assembly, an output member connected to one of said members of said first planetary gear assembly, a first member for connecting said one of said members of said first planetary gear assembly with one of said members of said third planetary gear assembly, a second member for connecting one of said members of said second planetary gear assembly with another of said members of said third planetary gear assembly, a third member for connecting another of said members of said first planetary gear assembly with another of said members of said second planetary gear assembly, a fourth member for connecting yet another member of said second planetary gear assembly with another of said members of said fourth planetary gear assembly, and a plurality of torque transmitting mechanisms selectively engageable to connect said another of said members of said third planetary gear assembly to ground, yet another of said members of said third planetary gear assembly to ground, yet another of said members of said first planetary gear assembly to ground, yet another of said members of said fourth planetary gear assembly to ground, said input shaft to said yet another of said members of said third planetary gear assembly, said yet another of said members of said second planetary gear assembly to said second connecting member and said another of said members of said fourth planetary gear assembly to said yet another of said members of said fourth planetary gear assembly.

2. The multiple speed automatic transmission of claim 1 wherein a first group of said plurality of torque transmitting devices are brakes and a second group of said plurality of torque transmitting devices are clutches.

3. The multiple speed automatic transmission of claim 1 wherein said one member of said first planetary gear assembly is a planet gear carrier, said another member of said first planetary gear assembly is a ring gear and said yet another member of said first planetary gear assembly is a sun gear.

4. The multiple speed automatic transmission of claim 1 wherein said one member of said second planetary gear assembly is a ring gear, said another member of said second planetary gear assembly is a planet gear carrier and said yet another member of said second planetary gear assembly is a sun gear.

5. The multiple speed automatic transmission of claim 1 wherein said one member of said third planetary gear assembly is a ring gear, said another member of said third planetary gear assembly is a planet gear carrier and said yet another member of said third planetary gear assembly is a sun gear.

6. The multiple speed automatic transmission of claim 1 wherein said one member of said fourth planetary gear assembly is a planet gear carrier, said another member of said fourth planetary gear assembly is a ring gear and said yet another member of said fourth planetary gear assembly is a sun gear.

7. The multiple speed automatic transmission of claim 1 wherein each of said first, second and third members of said first, second, third and fourth planetary gear assemblies is one of a sun gear, a ring gear and a planet gear carrier.

8. A multiple speed automatic transmission comprising, in combination,
- a first, a second, a third and a fourth planetary gear assembly, each planetary gear assembly having a ring gear, a sun gear and a planet gear carrier,
- an input member connected to said planet gear carrier of said fourth planetary gear assembly,
- an output member connected to said planet gear carrier of said first planetary gear assembly,
- a first member for connecting said planet gear carrier of said first planetary gear assembly with said ring gear of said third planetary gear assembly,
- a second member for connecting said ring gear of said second planetary gear assembly with said planet gear carrier of said third planetary gear assembly,
- a third member for connecting said ring gear of said first planetary gear assembly with said planet gear carrier of said second planetary gear assembly,
- a fourth member for connecting said sun gear of said second planetary gear assembly with said ring gear of said fourth planetary gear assembly, and
- a plurality of torque transmitting mechanisms selectively engageable to connect said planet gear carrier of said third planetary gear assembly to ground, said sun gear of said third planetary gear assembly to ground, said sun gear of said first planetary gear assembly to ground, said sun gear of said fourth planetary gear assembly to ground, said input shaft to said sun gear of said third planetary gear assembly, said sun gear of said second planetary gear assembly to said second connecting member and said ring gear of said fourth planetary gear assembly to said sun gear of said fourth planetary gear assembly.

9. The multiple speed automatic transmission of claim 8 wherein a first group of said plurality of torque transmitting devices are brakes and a second group of said plurality of torque transmitting devices are clutches.

10. The multiple speed automatic transmission of claim 8 wherein brakes connect said planet gear carrier of said third planetary gear assembly to ground, said sun gear of said third planetary gear assembly to ground, said sun gear of said first planetary gear assembly to ground and said sun gear of said fourth planetary gear assembly to ground.

11. The multiple speed automatic transmission of claim 8 wherein clutches connect said input shaft to said sun gear of said third planetary gear assembly, said sun gear of said second planetary gear assembly to said second connecting member and said ring gear of said fourth planetary gear assembly to said sun gear of said fourth planetary gear assembly.

12. The multiple speed automatic transmission of claim 8 configured to provide at least eight forward gear ratios.

13. The multiple speed automatic transmission of claim 8 wherein said ground is a transmission housing.

14. A multiple speed automatic transmission comprising, in combination,
- a first, a second, a third and a fourth planetary gear assembly, each planetary gear assembly including a ring gear, a sun gear and a planet gear carrier,
- an input member connected to said planet gear carrier of said fourth planetary gear assembly,
- an output member connected to said planet gear carrier of said first planetary gear assembly,
- a first member for connecting said planet gear carrier of said first planetary gear assembly with said ring gear of said third planetary gear assembly,
- a second member for connecting said ring gear of said second planetary gear assembly with said planet gear carrier of said third planetary gear assembly,
- a third member for connecting said ring gear of said first planetary gear assembly with said planet gear carrier of said second planetary gear assembly,
- a fourth member for connecting said sun gear of said second planetary gear assembly with said ring gear of said fourth planetary gear assembly, and
- a plurality of selectively engageable torque transmitting mechanisms including a first brake to connect said planet gear carrier of said third planetary gear assembly to ground, a second brake to connect said sun gear of said third planetary gear assembly to ground, a third brake to connect said sun gear of said first planetary gear assembly to ground, a fourth brake to connect said sun gear of said fourth planetary gear assembly to ground, a first clutch to connect said input shaft to said sun gear of said third planetary gear assembly, a second clutch to connect said sun gear of said second planetary gear assembly to said second connecting member and a third clutch to connect said ring gear of said fourth planetary gear assembly to said sun gear of said fourth planetary gear assembly.

15. The multiple speed automatic transmission of claim 14 configured to provide at least eight forward gear ratios.

16. The multiple speed automatic transmission of claim 14 wherein said ground is a transmission housing.

* * * * *